(12) United States Patent
Alon et al.

(10) Patent No.: US 8,688,944 B2
(45) Date of Patent: Apr. 1, 2014

(54) MEMORY SHARING BETWEEN EMBEDDED CONTROLLER AND CENTRAL PROCESSING UNIT CHIPSET

(75) Inventors: Moshe Alon, Tel Aviv (IL); Michal Schramm, Tel Aviv (IL); Nir Tasher, Tel Mond (IL)

(73) Assignee: Nuvoton Technology Corporation, Hsin-Chu (TW)

( * ) Notice: Subject to any disclaimer, the term of this patent is extended or adjusted under 35 U.S.C. 154(b) by 216 days.

(21) Appl. No.: 13/236,673

(22) Filed: Sep. 20, 2011

(65) Prior Publication Data
US 2013/0073810 A1  Mar. 21, 2013

(51) Int. Cl.
*G06F 12/00* (2006.01)
*G06F 12/08* (2006.01)
(52) U.S. Cl.
USPC .... 711/168; 711/137; 711/147; 711/E12.001; 711/E12.067
(58) Field of Classification Search
USPC .................................. 711/137, 147
See application file for complete search history.

(56) References Cited

U.S. PATENT DOCUMENTS

| | | | |
|---|---|---|---|
| 6,687,903 B1 | 2/2004 | Chalmer et al. | |
| 7,730,265 B1 | 6/2010 | Cypher et al. | |
| 7,818,529 B2 | 10/2010 | Hou | |
| 7,930,576 B2 | 4/2011 | Harris et al. | |
| 2013/0021352 A1* | 1/2013 | Wyatt et al. | 345/520 |

OTHER PUBLICATIONS

Winbond Electronics Corp., "Spiflash-16-Mbit, 32-Mbit and 64-Mbit Serial Flash Memory with 4KB Sectors and Dual Output SPI," Revision 1, May 5, 2008.
U.S. Appl. No. 13/360,746, filed Jan. 29, 2012.

* cited by examiner

*Primary Examiner* — Mardochee Chery
(74) *Attorney, Agent, or Firm* — D. Kliger IP Services Ltd.

(57) ABSTRACT

An embedded controller includes a microcontroller core and memory control circuitry. The memory control circuitry is configured to communicate with a Central Processing Unit (CPU) chipset over a first Serial Peripheral Interface (SPI), for which bus arbitration is not supported, at a first clock rate, to communicate with a memory over a second SPI at a second, fixed clock rate, to relay memory transactions between the CPU chipset and the memory over the first and second SPIs, to identify time intervals in which no memory transactions are relayed on the second SPI and to retrieve from the memory information for operating the microcontroller core during the identified time intervals.

41 Claims, 8 Drawing Sheets

MEMORY SHARING BETWEEN EMBEDDED CONTROLLER AND CENTRAL PROCESSING UNIT CHIPSET

FIELD OF THE INVENTION

The present invention relates generally to computer architectures, and particularly to sharing of memory between an embedded controller and a central processing unit.

BACKGROUND OF THE INVENTION

Various techniques are known in the art for sharing memory resources between processors. For example, U.S. Pat. No. 7,818,529, whose disclosure is incorporated herein by reference, describes an integrated memory control apparatus including a first interface decoder, a second interface decoder and an interface controller is provided. The first interface decoder is coupled to a control chip through a first Serial Peripheral Interface (SPI), the second interface decoder is coupled to a micro-processor unit through a general transmission interface, and the interface controller is coupled to a memory through a second SPI. When the interface controller receives the request signals from the control chip and the micro-processor unit, the control chip may correctly read data from the memory through the first and second SPI. On the other hand, the micro-processor unit may stop reading data from the memory through the general transmission interface. Therefore, the control chip and the micro-processor unit can share the same memory.

SUMMARY OF THE INVENTION

An embodiment of the present invention that is described herein provides an embedded controller including a microcontroller core and memory control circuitry. The memory control circuitry is configured to communicate with a Central Processing Unit (CPU) chipset over a first Serial Peripheral Interface (SPI), for which bus arbitration is not supported, at a first clock rate, to communicate with a memory over a second SPI at a second, fixed clock rate, to relay memory transactions between the CPU chipset and the memory over the first and second SPIs, to identify time intervals in which no memory transactions are relayed on the second SPI and to retrieve from the memory information for operating the microcontroller core during the identified time intervals.

In some embodiments, the information includes software code for running the microcontroller core, and the memory control circuitry is configured to retrieve the software code from the memory during the identified time intervals and to cause the microcontroller core to execute the retrieved software code. In an embodiment, the second clock rate is greater than or equal to the first clock rate. In a disclosed embodiment, the memory control circuitry is configured to generate a second clock signal for use in the second SPI based on a first clock signal used in the first SPI.

In another embodiment, the microcontroller core is configured to continue operating while the second SPI is occupied by the memory transactions and the memory control circuitry is unable to retrieve the information from the memory. In an embodiment, the microcontroller core is configured to continue operating using alternative information stored in alternative memory when the memory control circuitry is unable to retrieve the information from the memory. In yet another embodiment, the memory control circuitry is configured to produce a validity signal indicating whether it is able to retrieve the information from the memory.

In some embodiments, for relaying a given memory transaction, the memory control circuitry is configured to communicate with the CPU chipset in accordance with a first transaction type and with the memory in accordance with a second transaction type, different from the first transaction type. In an embodiment, the first transaction type provides address information on a first number of interface lines, and the second transaction type provides the address information on a second number of interface lines, different from the first number. In another embodiment, the first transaction type provides data information on a first number of interface lines, and the second transaction type provides the data information on a second number of interface lines, different from the first number.

In yet another embodiment, each of the first and second transaction types includes at least one transaction type selected from a group of types consisting of a normal transaction, a fast-read transaction, a fast-read dual-Output transaction, a fast-read dual-I/O transaction and a fast-read Quad-I/O transaction. In still another embodiment, the first transaction type is set by the CPU chipset, and the memory control circuitry is configured to identify the first transaction type and to select the second transaction type based on the identified first transaction type.

In a disclosed embodiment, for a given memory transaction, the memory control circuitry is configured to identify a type of the given memory transaction and to select the second clock rate based on the identified type. In an embodiment, the memory control circuitry is configured to convert a given memory transaction over the first SPI into multiple memory transactions over the second SPI. In another embodiment, in a given transaction, the memory control circuitry is configured to transfer from the CPU chipset to the memory an address to be read, and to transfer from the memory to the CPU chipset data that is read from the address, such that the data is transferred over the first SPI starting on a clock cycle that immediately follows a last bit of the address. In an example embodiment, first and second clock signals used respectively on the first and second SPIs are synchronous with one another and have defined timing during one or more cycles of the given transaction.

In some embodiments, the memory control circuitry is configured to insert one or more dummy cycles between address and data information transferred over the second SPI if dummy cycles are inserted by the CPU chipset on the first SPI. In an embodiment, the memory control circuitry is configured to pre-fetch data from the memory before the data is requested by the CPU chipset, to cache the pre-fetched data and to subsequently provide the cached data to the CPU chipset.

In another embodiment, the memory control circuitry is configured to pre-fetch status information from the memory irrespective of receiving read status transactions from the CPU chipset, and to provide the pre-fetched status information to the CPU chipset upon receiving the read status transactions. In yet another embodiment, the memory control circuitry is configured to pre-fetch a descriptors section from the memory during an initiation phase of the CPU chipset, to store the descriptors section in an internal memory of the embedded controller, and, after the initiation phase, to provide the stored descriptors section to the CPU chipset.

There is additionally provided, in accordance with an embodiment of the present invention, a method that includes communicating, using an embedded controller, with a Central Processing Unit (CPU) chipset over a first Serial Peripheral Interface (SPI), for which bus arbitration is not supported, at a first clock rate, and with a memory over a second SPI at a second, fixed clock rate. Memory transactions are relayed between the CPU chipset and the memory over the first and second SPIs. Time intervals are identified, in which no memory transactions are relayed on the second SPI. Information for operating the embedded controller is retrieved from the memory during the identified time intervals.

There is also provided, in accordance with an embodiment of the present invention, a computer including a Central Processing Unit (CPU) chipset, a memory and an embedded controller. The embedded controller is configured to communicate with the CPU chipset over a first Serial Peripheral Interface (SPI), for which bus arbitration is not supported, at a first clock rate, to communicate with the memory over a second SPI at a second, fixed clock rate, to relay memory transactions between the CPU chipset and the memory over the first and second SPIs, to identify time intervals in which no memory transactions are relayed on the second SPI bus, and to retrieve from the memory information for operating the embedded controller during the identified time intervals.

The present invention will be more fully understood from the following detailed description of the embodiments thereof, taken together with the drawings in which:

DETAILED DESCRIPTION OF EMBODIMENTS

Overview

In some computer architectures, a computer comprises an Embedded Controller (EC) that operates in conjunction with the computer's Central Processing Unit (CPU). The EC typically carries out various system functions such as keyboard scanning, power management, battery charging and fan control.

Embodiments of the present invention that are described herein provide improved EC configurations and associated methods. The disclosed techniques enable the computer's CPU chipset (referred to as chipset for brevity) and the EC to share the same memory, thus eliminating the need to dedicate separate memory devices for the EC. For example, the disclosed techniques enable storing the EC program code in the shared external memory rather than in an internal memory, and for the EC to fetch and execute the program code from the shared memory in real time. Sharing memory resources between the chipset and the EC reduces the cost and power consumption of the EC and of the computer as a whole, and may reduce component count and simplify the computer configuration.

In the disclosed embodiments, the shared memory comprises a serial Flash device that communicates using a Serial Peripheral Interface (SPI). The EC is connected using SPI between the chipset and the memory, i.e., connected to the chipset over a first SPI and with the memory using a second SPI. No arbitration is supported on the first SPI. The EC comprises a microcontroller core that carries out the different system control functions, and memory control circuitry that carries out memory sharing.

The memory control circuitry relays memory transactions between the chipset and the memory over the two SPIs. In addition, this circuitry identifies time intervals in which no memory transactions are relayed between the chipset and the memory on the second SPI, and uses these time intervals to fetch information (e.g., program code) from the memory for operating the EC microcontroller core. If a chipset memory transaction is initiated while an EC memory transaction is in progress, the EC memory transaction is aborted in order to give priority to the chipset memory transaction.

Typically, the memory control circuitry generates a clock signal for the second (memory-side) SPI based on the clock signal of the first (chipset-side) clock signal. The clock signal of the memory-side SPI is generated at a fixed clock rate that is higher than that of the chipset-side clock signal, and the two clock signals are synchronized with one another, i.e., one clock rate is a (not necessarily integer) multiple of the other and the clock signals are locked to one another. (The term "fixed" means fixed during a given memory transaction. As will be explained below, the memory-side clock rate can be set to different values in different transactions.)

The high clock rate on the memory-side SPI enables the relaying operation of the EC to meet the timing requirements of the chipset-memory interface specifications. This property is particularly important since the chipset-memory interface typically does not allow any wait states. Moreover, the high clock rate shortens the memory transactions on the second SPI, leaving more time available for fetching information from the memory to the EC microcontroller.

Several examples of relaying schemes are described herein, which match various capabilities and commands supported by the memory and the chipset. Several techniques for eliminating "starvation" scenarios, in which the chipset's memory transactions continuously block information fetching for the EC microcontroller core, are also described. Moreover, the disclosed techniques enable the EC microcontroller core to continue operating even when it is unable to fetch information from the memory for a long period of time.

System Description

Figure 1:
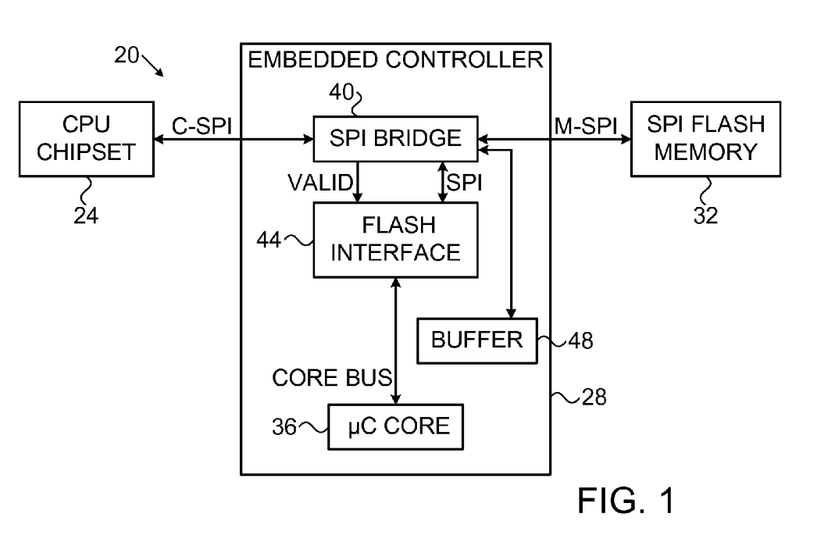
FIG. 1 is a block diagram that schematically illustrates elements of a computer, in accordance with an embodiment of the present invention.

FIG. 1 is a block diagram that schematically illustrates elements of a computer 20, in accordance with an embodiment of the present invention. Computer 20 may comprise, for example, a laptop, notebook or tablet computer, or any other suitable computer type. Elements of the computer that are not mandatory for understanding of the disclosed techniques have been omitted from the figure for the sake of clarity.

Computer 20 comprises a Central Processing Unit (CPU) chipset 24, for example an Intel Pentium chipset. The chipset may comprise one or more Integrated Circuits (ICs). Computer 20 further comprises an Embedded Controller (EC) 28, which carries out various system functions such as keyboard scanning, power management, battery charging, fan control and/or any other suitable function.

Both chipset 24 and EC 28 use memory resources of a Flash memory 32. Techniques for sharing the access of memory 32 between the chipset and the EC are described in detail below. In the present example, memory 32 comprises a serial Flash device, which communicates using a Serial Peripheral Interface (SPI). Examples of such devices are W25X16, W25X16A, W25X32 and W25X64 devices produced by Winbond Electronics Corp. (Taichung city, Taiwan). These devices are specified in "Spiflash—16M-bit, 32M-bit and 64M-bit Serial Flash Memory with 4 KB Sectors and Dual Output SPI," revision 1, May 5, 2008, which is incorporated herein by reference. Alternatively, any other suitable memory device can be used.

As can be seen in FIG. 1, EC 28 is connected between chipset 24 and memory 32 using two SPIs. A first SPI, denoted C-SPI, is used for communication between EC 28 and chipset 24. A second SPI, denoted M-SPI, is used for communication between EC 28 and memory 32.

EC 28 comprises a microcontroller core 36, which carries out the various system functions of the EC. Microcontroller core 36 is sometimes referred to herein as "microcontroller" for brevity. In addition, EC 28 comprises memory control circuitry that carries out the memory sharing schemes described herein. In the present example, the memory control circuitry comprises a SPI bridge 40, a Flash interface 44 and a buffer 48.

SPI bridge 40 relays memory transactions (e.g., read, write and erase transactions) between chipset 24 and memory 32. In addition, the SPI bridge provides an information path between the EC microcontroller 36 and memory 32. For example, the code that is executed in real time by microcontroller core 36 passes through the SPI bridge (applicable with or without caching). The operation of SPI bridge 40 is described in greater detail further below.

Flash interface 44 interfaces between microcontroller 36 and SPI bridge 40. The Flash interface communicates with microcontroller core 36 over a core bus, and with SPI bridge 40 using SPI. In some embodiments, Flash interface 40 receives from the SPI bridge VALID signals, which indicate whether the information fetched from memory 32 for microcontroller core 36 is valid or not. Buffer 48, in the present example a 64-byte buffer, is used for pre-fetching of information from memory 32.

The configuration of EC 28 shown in FIG. 1 is an example configuration, which is chosen purely for the sake of conceptual clarity. In alternative embodiments, any other suitable EC configuration can be used. The functions of the various EC elements can be implemented in hardware, in software, or using a combination of hardware and software elements.

In some embodiments, certain EC functions are implemented in a programmable processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

SPI Flash Sharing Between Chipset and EC

As noted above, SPI bridge 40 relays memory transactions between chipset 24 and SPI Flash memory 32. Typically, the interface specification between the chipset and the memory imposes strict timing requirements on the memory transactions. The interface typically does not allow any wait states or arbitration, and assumes a point-to-point connection between the memory and a single chipset. SPI bridge 40 relays the memory transactions between chipset 24 and memory 32, and also routes information between EC microcontroller core 36 and memory 32, while meeting these strict timing requirements.

In some disclosed embodiments, SPI bridge 40 relays various types of memory transactions, such as, for example, standard read commands at a clock rate of 20 MHz, fast-read commands at 20 MHz, 33 MHz and 50 MHz, write and erase commands, control and status commands, and/or any other suitable memory transaction. The SPI bridge controls and routes program code or otherwise exchanges information between EC microcontroller core 36 and memory 32, for example at clock rates up to 50 MHz. In some embodiments, the clock rate on the M-SPI may differ between transactions initiated by chipset 24 and transactions initiated by EC microcontroller core 36.

In some embodiments, SPI bridge 40 generates the clock signal for the M-SPI from the clock signal it receives from the C-SPI. The SPI bridge typically generates the M-SPI clock signal at a higher clock rate than that of the C-SPI. Typically, the M-SPI clock rate is fixed, and is a (fractional or integer) multiple of the C-SPI clock rate. In one example embodiment, the M-SPI clock rate is higher by a factor of 4/3 than the C-SPI clock rate, although any other suitable ratio can be used. In some embodiments, the two clock signals are synchronized with one another, i.e., have little or no mutual drift or jitter, at least for certain types of transactions. For other types of transactions, tight synchronization is not required. The performance advantages achieved by the higher M-SPI clock rate are explained and demonstrated further below. Because of the higher clock rate on the M-SPI, SPI bridge 40 is typically able to pre-fetch data from memory 32 before it is requested by chipset 24. The pre-fetched data is cached in buffer 48.

In some embodiments, SPI bridge 40 modifies the type of transaction when relaying the memory transactions. For example, bridge 40 may receive fast read or fast read dual output commands from chipset 24, and translate them into dual-I/O or Quad-I/O read commands (i.e., read commands in which the address and data information is provided in parallel over two or four interface lines) toward memory 32. In these embodiments, SPI bridge 40 communicates with chipset 24 using one transaction type, communicates with memory 32 using a different transaction type, and translates between the two types of transactions (in both directions) when relaying the memory transactions.

Transaction types such as dual-I/O and Quad I/O enable the M-SPI to operate with short transactions (in comparison with the C-SPI transactions) at a relatively low bus utilization. The above-described translation techniques enable the M-SPI to operate with such short transactions at low bus utilization, even when the chipset does not support these transaction types (provided, of course, that memory 32 supports them). As a result of the lower bus utilization of the CPU chipset memory transactions, more time on the M-SPI is available for exchanging information between memory 32 and EC microcontroller core 36. Moreover, this technique reduces the likelihood of "starvation" scenarios in which the EC microcontroller is blocked from communicating with memory 32 due to a high volume of chipset memory transactions.

Example relaying schemes in which the SPI bridge uses different transaction types toward the chipset and toward the memory are described in detail further below, e.g., in FIGS. 4 and 5. In some embodiments, the SPI bridge maintains the same type of transaction toward the chipset and toward the memory, as shown for example in FIGS. 3A-3C.

In some embodiments, SPI bridge 40 selects the M-SPI clock rate based on the type of memory transaction and clock rate on the C-SPI. For example, if the C-SPI is set to fast-read transactions (simple or dual-I/O) at any clock rate below 40 MHz (e.g., 20 MHz or 33 MHz), the SPI bridge sets the clock rate on the M-SPI to 4/3 times the C-SPI clock rate. For example, if the C-SPI is set to fast-read transactions (simple or dual-I/O) at 50 MHz, the SPI bridge sets the M-SPI clock rate to the same value as the C-SPI clock rate.

In some embodiments, EC microcontroller 36 is able to continue running even in situations where information fetching from memory 32 over the M-SPI is blocked by chipset memory transactions for long time periods. In an embodiment, SPI bridge 40 checks every group of bits (e.g., 32 bits) that is transferred from memory 32 to microcontroller. For each bit group, the SPI bridge issues a VALID signal indicating whether this bit group is valid or not. A bit group may be invalid, for example, when its retrieval had to be aborted due to a chipset memory transaction on the M-SPI. When a bit group is found to be invalid, the SPI bridge retries to transfer the group until it is transferred successfully.

In some embodiments, microcontroller core 36 is not halted or suspended when it is unable to receive information (e.g., program code) from memory 32. For example, in some embodiments the EC comprises a small internal memory (not shown in the figure) that holds alternative program code for execution by microcontroller 36 when memory 32 is not reachable. In such scenarios, the EC microcontroller core may keep running using the alternative program code. In one embodiment, the alternative program code carries out basic system functions that prevent damage to computer 20, such as temperature monitoring and fan control.

In some embodiments, SPI bridge 40 divides a long chipset memory transaction on the C-SPI into multiple shorter memory transactions on the M-SPI. This technique is highly efficient in making the time available for EC memory transactions on the M-SPI more frequent and to reduce "starvation" periods of the EC microcontroller core. In some embodiments, the SPI bridge uses the higher M-SPI clock rate and/or the Dual or Quad-I/O transaction types to partition a long chipset transaction into shorter transactions on the M-SPI. In an embodiment, the SPI bridge pre-fetches information for the long chipset transaction from memory 32 and caches it in buffer 48.

Figure 2:
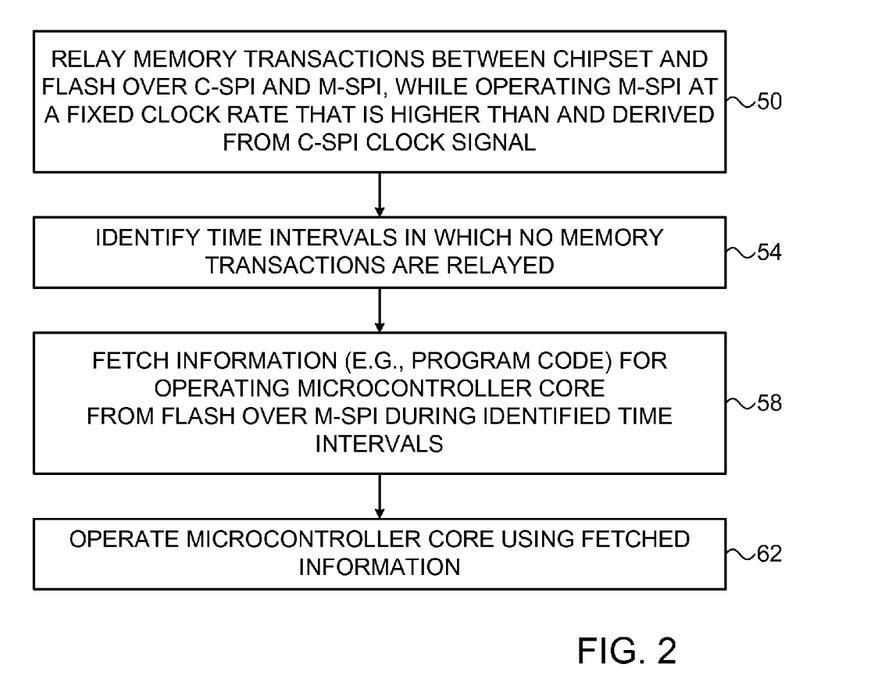
FIG. 2 is a flow chart that schematically illustrates a method for operating an embedded controller, in accordance with an embodiment of the present invention.

FIG. 2 is a flow chart that schematically illustrates a method for operating EC 28, in accordance with an embodiment of the present invention. The method begins with the EC relaying memory transactions between CPU chipset 24 and Flash memory 32, at a relaying step 50. In a typical flow, SPI bridge 40 in the EC receives a memory transaction (e.g., read, fast-read or fast-read dual-output) from chipset 24 over the C-SPI, and decodes the transaction command-code (the code identifying the type of command, referred to in the figures as "code" for brevity) so as to identify the type of transaction. Bridge 40 then buffers the incoming words (e.g., bytes) and transmits them to memory 32 at a higher clock rate over the M-SPI. When a response arrives over the M-SPI from memory 32 (e.g., data retrieved in response to a read command), bridge 40 buffers the incoming words and relays them to chipset 24 over the C-SPI at the lower clock rate.

During relaying of the chipset's memory transactions, SPI Flash interface 44 identifies time intervals in which no chipset memory transactions are relayed on the M-SPI, using the valid indication, at an interval identification step 54. Typically, the Flash interface identifies time intervals in which the M-SPI is idle. The Flash interface uses these time intervals to fetch information (e.g., program code) for microcontroller 36 from memory 32, at a fetching step 58. In some embodiments (for example when memory 32 comprises a SPI RAM rather than a SPI Flash), the SPI bridge may use the identified time intervals for storing information from microcontroller 36 in memory 32. EC microcontroller operates using the information (e.g., program code) fetched from memory 32, at an EC operation step 62.

Normal Read Transactions

Figure 3A:
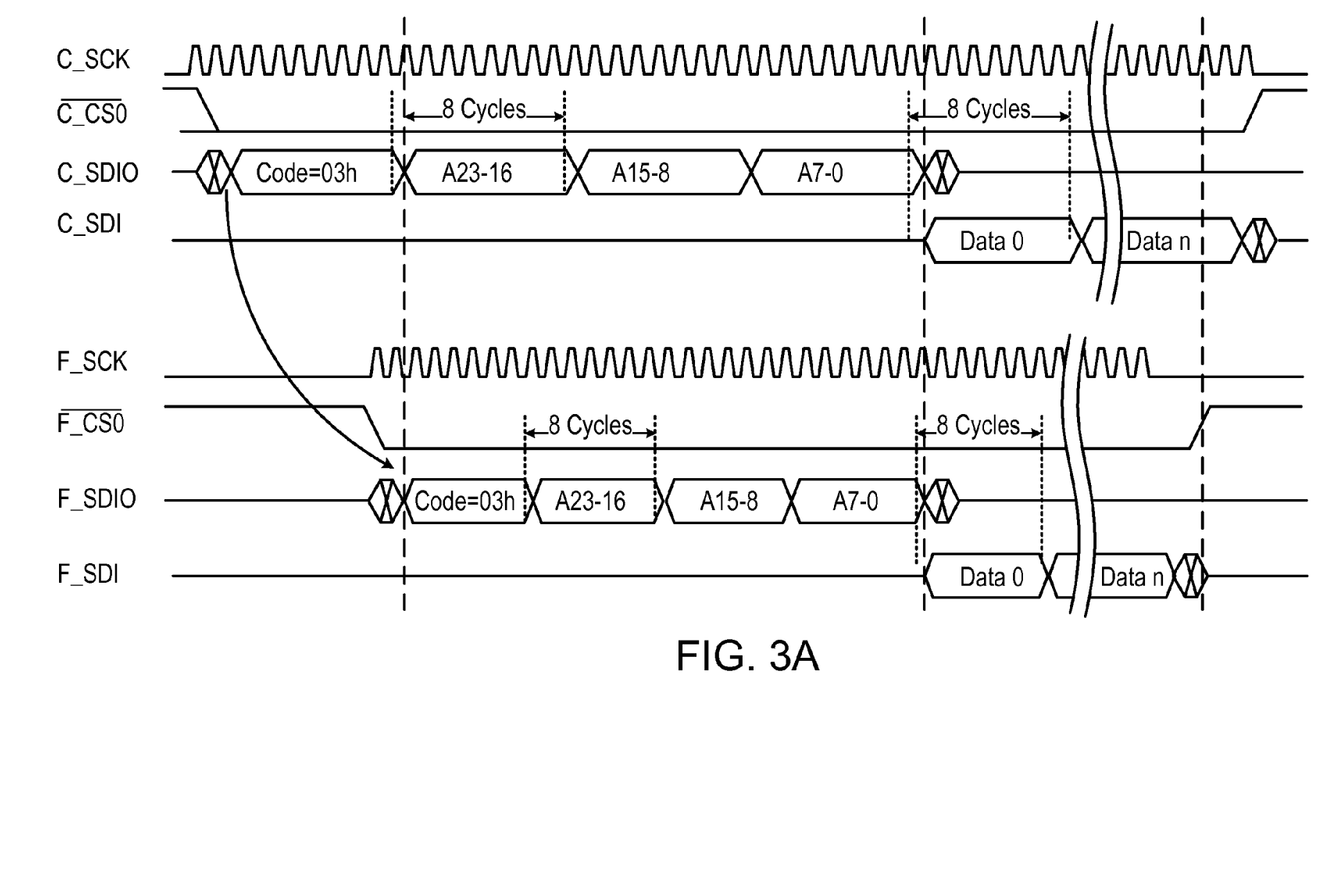
FIGS. 3A-3C and 4-8 are signal diagrams showing schemes for relaying memory transactions between a Central Processing Unit (CPU) chipset and a memory, in accordance with embodiments of the present invention.
Figure 3B:
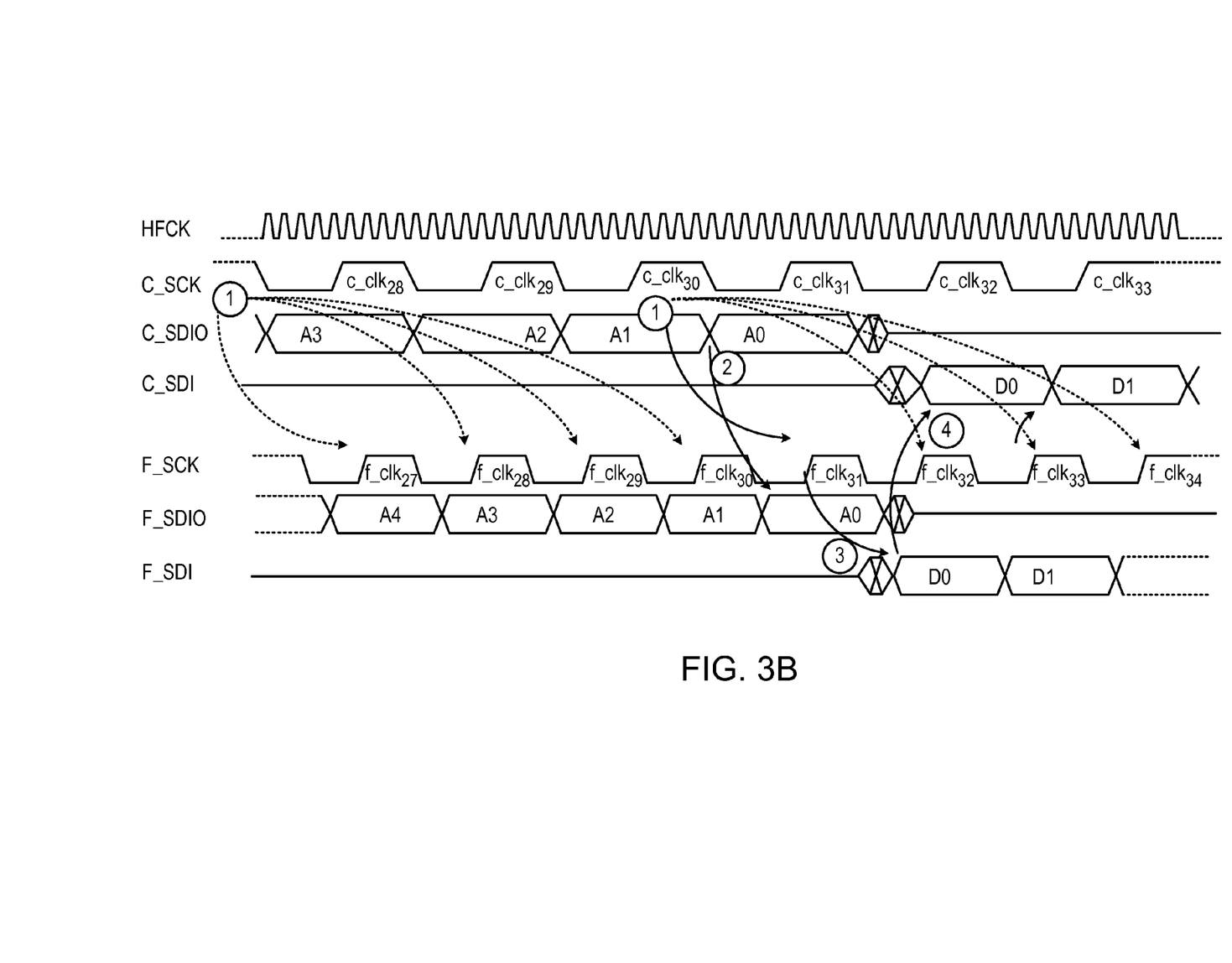
Figure 3C:
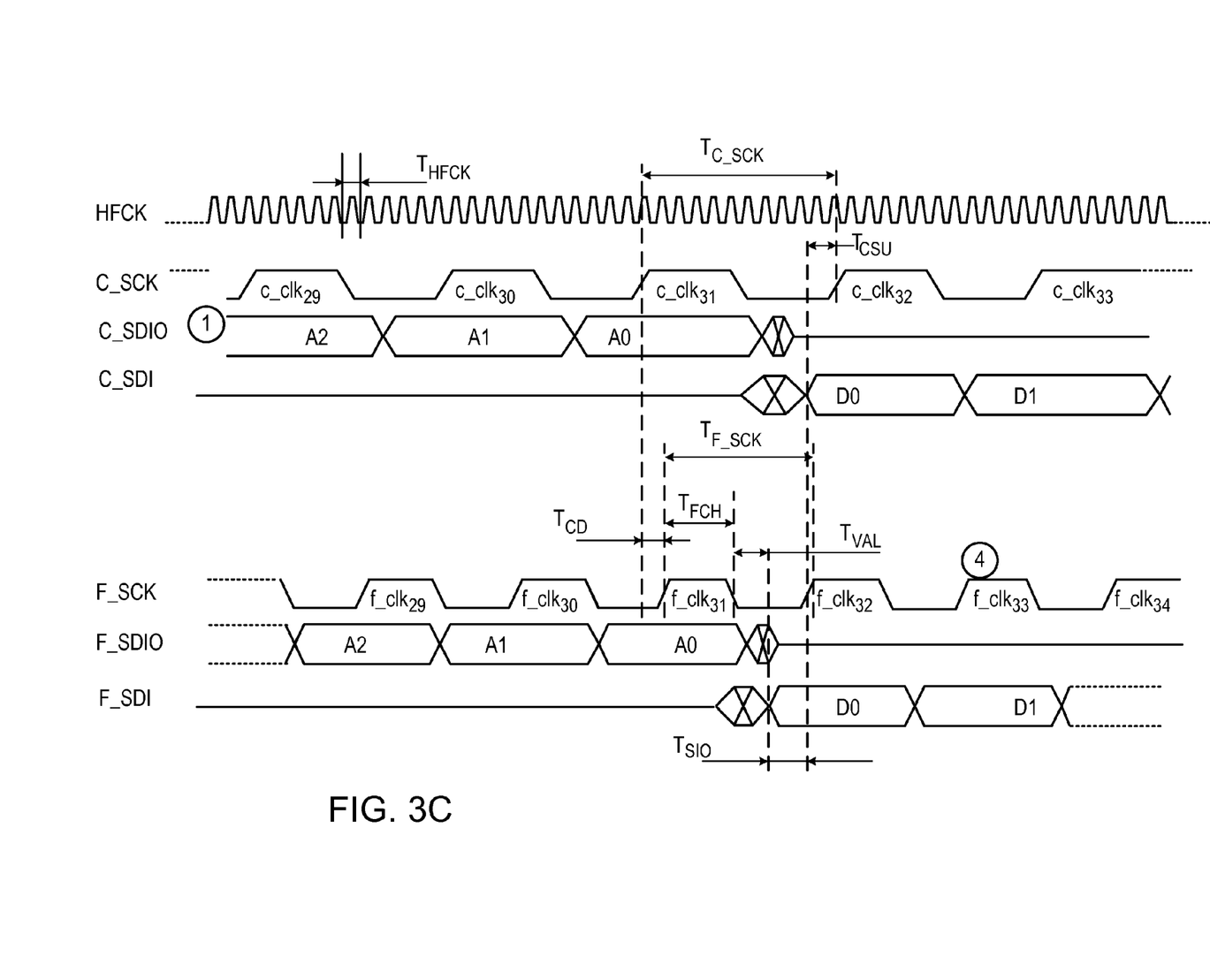

FIGS. 3A-3C are signal diagrams showing a scheme for relaying memory transactions by EC 28 between CPU chipset 24 and memory 32, in accordance with an embodiment of the present invention. In this example, SPI bridge 40 in EC 28 relays a normal (simple) read transaction between the chipset and the memory. The top four signals (C_SCK, $\overline{C\_CS0}$, C_SDIO and C_SDI) belong to the C-SPI, while the bottom four signals (F_SCK, $\overline{F\_CS0}$, F_SDIO and F_SDI) belong to the M-SPI.

Signal C_SCK is the serial clock signal of the C-SPI, and signal F_SCK is the serial clock signal of the C-SPI. In the present example, the F_SCK clock rate is higher than the C_SCK clock rate by a factor of 4/3. Signals $\overline{C\_CS0}$ and $\overline{F\_CS0}$ are the chip select signals on the C-SPI and M-SPI, respectively. The C_SDIO and F_SDIO signals carry the command-code and address words of the memory transaction over the C-SPI and M-SPI, respectively (and also data information for fast-read dual- or Quad-I/O). The C_SDI and F_SDI signals carry the data and address of the memory transaction over the C-SPI and M-SPI, respectively.

FIG. 3A shows the relayed transaction in general. As can be seen in the figure, the SPI bridge identifies the command-code of the normal read transaction (03h in this example) on the C_SDIO line. The SPI bridge sets the M-SPI clock rate to be 4/3 times the C-SPI clock rate, and relays the command-code followed by a sequence of address words from the chipset to the memory.

Immediately following the last address word, the SPI bridge begins relaying the retrieved data from the memory to the chipset. This adjacency is possible due to the clock synchronization between the C-SPI and the M-SPI, which together with the higher clock rate on the M-SPI enables the timing optimization of the last address bit, in comparison with the C-SPI clock rate.

FIGS. 3B and 3C focus on the instant switching between relaying of address words from the chipset to the memory, to relaying of data words from the memory to the chipset. As can be seen in the figure, the first data information is available on the C_SDI line in the next clock cycle after the end of the last address word on the C-SDIO line. This adjacency is a requirement in some memory interface specifications.

In the present example, SPI bridge 40 generates F_SCK (the M-SPI clock signal) from C_SCK (the C-SPI clock signal) using a high-frequency clock signal denoted HFCK (in this example a 150 MHz clock signal with 50% duty cycle). During the command phase of the transaction, an internal counter in the SPI bridge counts the number of HFCK cycles during six C_SCK cycles, to produce the F_SCK. This mechanism (marked "1" in FIG. 3B) produces F_SCK that is faster than C_SCK by a factor of 4/3, and the two clock signals are also synchronized to one another every three C_SCK clock cycles.

The last address bit (AO) passes through the SPI bridge, such that the address on the pins of memory 32 is stable before the F_SCK rising edge (marked "2" in FIG. 3B). In this example, other address bits are previously sampled by the SPI bridge, and the bridge is responsible for the setup and hold times for these bits on the memory side.

Following the last address bit, memory 32 provides the first data bit (marked "3" in FIG. 3B). The first data bit (D0) passes through the SPI bridge, such that valid data is present on the C_SDI chipset pad on the first data cycle (marked "4" in FIG. 3B). On the following cycles the data is sampled by the SPI bridge and provided to the chipset before the rising edges of the C_SCK clock signal.

The exact timing of this example can be seen in FIG. 3C. In this embodiment, the clock period of C_SCK is $T_{C\_SCK(Min)}=$ 48 nS. The set-up time of C_SDIO is $T_{CSU(Max)}=2$ nS. The maximum offset between F_SCK and C_SCK is $T_{CD(Max)}=9$ nS. The minimum offset between F_SCK and C_SCK is $T_{CDLT(Min)}=-5$ nS. The high period of F_SCK is $T_{FCH(Max)}=2T_{HFCK}=14$ nS. The F_SCK clock period is $T_{F\_SCK(Max)}=T_{C\_SCK(Max)}\cdot 3/4=36$ nS. The maximum delay of valid data at the output of memory 32 is $T_{VAL(Max)}=9$ nS. Thus, the maximum allowed data delay of the SPI bridge and wires under worst-case conditions is $T_{SIO(Max)}=T_{C\_SCK(Min)}-T_{CD(Max)}-T_{FCH(Max)}-T_{VAL(Max)}-T_{CSU(Max)}=48-9-14-9-2=18$ nS.

The calculation above applies to the Winbond serial Flash devices cited above. For other types of memory devices, the maximum allowed delay may be smaller, e.g., because $T_{CSU}$ may be negative.

The disclosed technique takes advantage of the relatively large setup time of the C_SDIO signal (also sometimes referred to as MOSI signal) relative to the SPI clock: In some cases the rising edge of the M-SPI clock signal (generated by the EC) can be asserted before the edge of the SPI clock, while still sampling the C_SDIO signal correctly by memory 32.

Dual and Quad I/O Transactions

As noted above, in some embodiments SPI bridge 40 relays a given memory transaction by communicating with the chipset using one transaction type, and with the memory using a different transaction type. The transaction type may define, for example, the number of lines over which the address information of the transaction is provided in parallel. Example types of transactions comprise normal, simple or fast read transactions in which the address information is provided over a single line, dual-output transactions in which the address information is provided over a single line and the data over two lines, dual-I/O transactions in which the address information is provided in parallel over two lines, and Quad-I/O transactions in which the address information is provided in parallel over four lines.

In some embodiments, EC 28 communicates with memory 32 during initialization in order to determine the types of transactions that are supported by the memory. Having determined the supported transaction types, the EC selects the type of transaction to be used vis-à-vis memory 32 when relaying memory transactions. In an example embodiment, the chipset issues fast-read transactions, but the memory is capable of handling Dual-I/O transactions. In this case, SPI bridge 40 typically relays the memory transactions while translating between the fast and Dual-I/O types. As a result, the M-SPI is operated at a relatively low bus utilization, leaving more time available for exchanging information between memory 32 and EC microcontroller core 36.

Moreover, the use of Dual-I/O or Quad-I/O transactions on the M-SPI makes the disclosed techniques highly tolerant to SPI clock inaccuracy on both the chipset side and the memory side. In some embodiments, the higher throughput on the M-SPI (achieved by the use of higher clock rate and/or Dual-I/O or Quad-I/O transactions) enables the SPI bridge to pre-fetch information from memory 32. The pre-fetched information is buffered in buffer 48 and later provided to the chipset.

Figure 4:
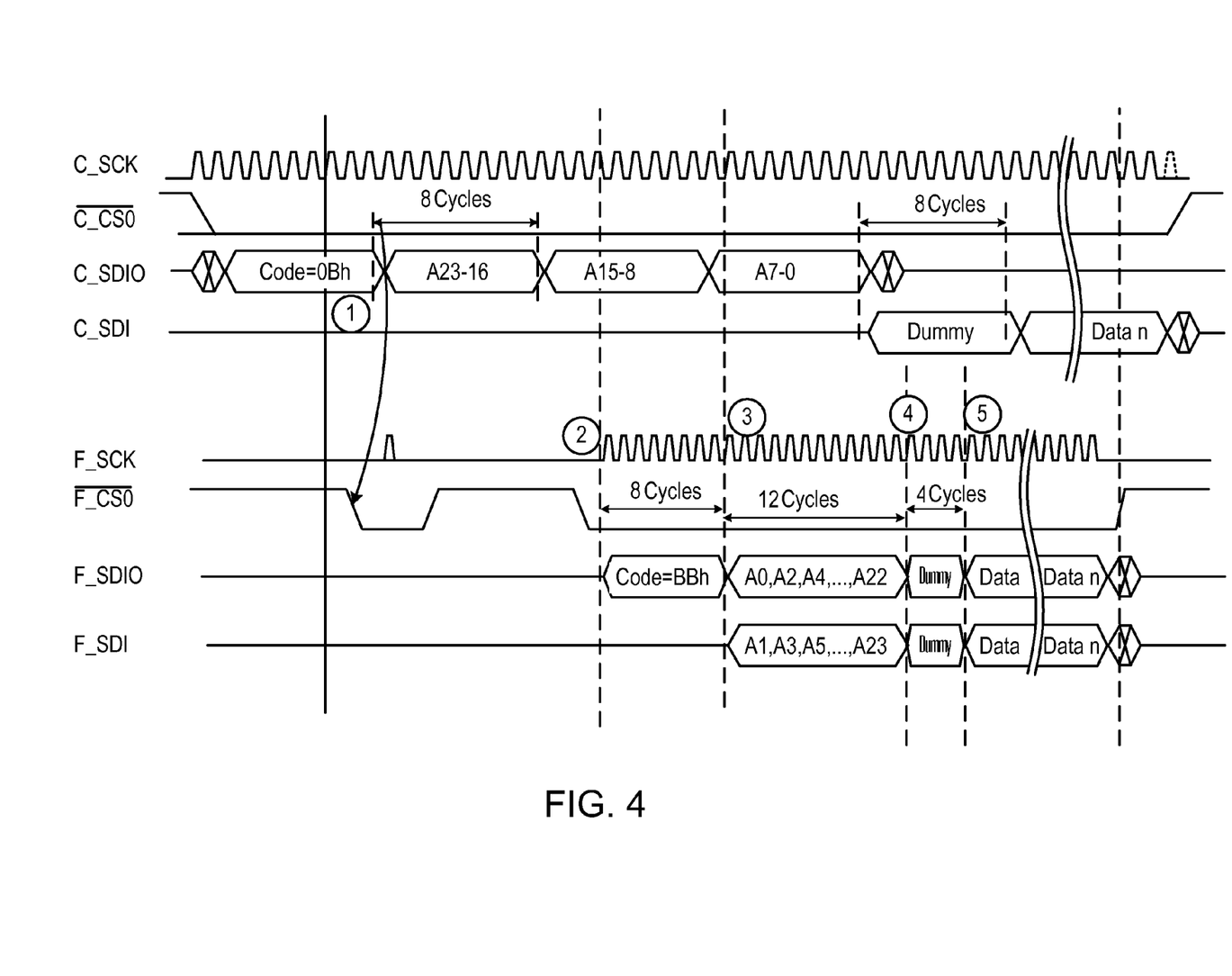

FIG. 4 is a signal diagram showing a scheme for relaying memory transactions by EC 28 between chipset 24 and memory 32, in accordance with another embodiment of the present invention. In this example, SPI bridge 40 relays a fast-read transaction issued by the chipset while performing a fast-read Dual-I/O transaction toward memory 32. As can be seen in the figure, over the C-SPI the address information is provided on a single line (C_SDIO). Over the M-SPI, on the other hand, the address information is provided in parallel over two lines (F_SDIO and F_SDI).

In this example, the chip select signal $\overline{F\_CS0}$ is asserted (marked "1" in the figure) before completion of the transaction command-code phase, in order to support other transaction types such as standard read and write transactions and read status transactions. The first F_SCK cycle is generated (marked "2" in the figure) $34t_{C\text{-}CSK}-20t_{F\text{-}CSK}$ after the first C_CSK clock rising edge.

After eight cycles of the SPI command on the M-SPI, twenty-four bits of address are sent (marked "3" in the figure) during the next twelve F_SCK cycles. The address phase ends (marked "4" in the figure) during eight dummy bit cycles that are sent over the C-SPI. The transaction is initiated such that four dummy bits on the M-SPI will also end (marked "5" in the figure) during the eight dummy bits on the C-SPI. The SPI bridge inserts dummy cycles on the M-SPI if dummy cycles are inserted on the C-SPI. For both Dual-I/O (FIG. 4) and normal read transactions (FIGS. 3A-3C), the transaction on the C-SPI will typically end later than the transaction over the M-SPI (unless the transaction on the C-SPI ends before sixty-four bytes are fetched by the SPI bridge). After the completion of a transaction on the M-SPI, the data on the C-SPI is loaded from the buffer 48.

Figure 5:
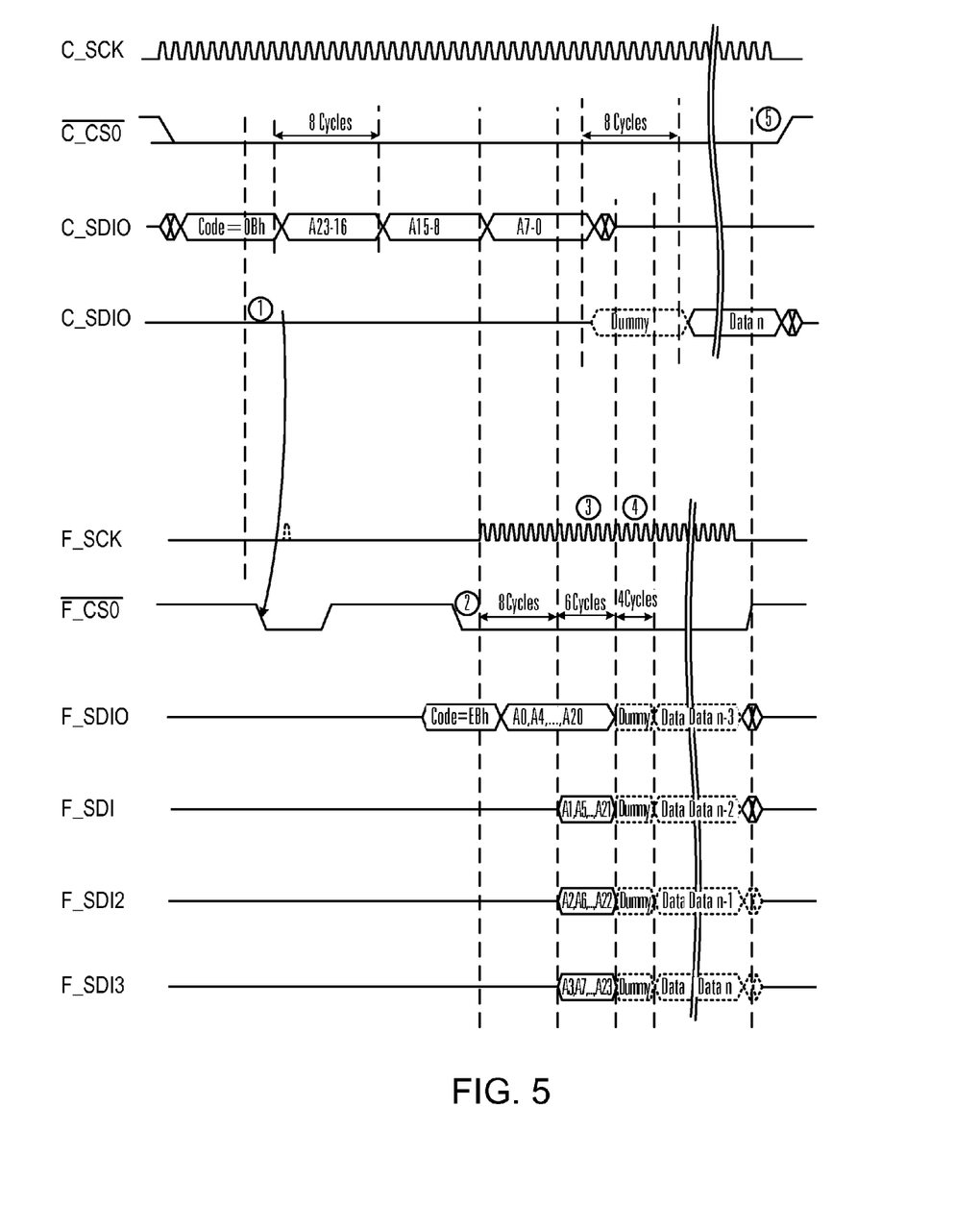

FIG. 5 is a signal diagram showing a scheme for relaying memory transactions by EC 28 between chipset 24 and memory 32, in accordance with yet another embodiment of the present invention. In this example, SPI bridge 40 relays a fast-read transaction issued by the chipset while performing a fast-read Quad-I/O transaction toward memory 32. As can be seen in the figure, over the C-SPI the address information is provided on a single line (C_SDIO). Over the M-SPI, however, the address information is provided in parallel over four lines (F_SDIO, F_SDI, F_SDI2 and F_SDI3).

In this example, the chip select signal $\overline{F\_CS0}$ is asserted (marked "1" in the figure) before completion of the transaction command-code phase, in order to support other transaction types as noted above. The first F_SCK cycle is generated (marked "2" in the figure) $34t_{C\text{-}CSK}-14t_{F\text{-}CSK}$ cycles after the first C_CSK clock rising edge.

After eight cycles of the SPI command on the M-SPI, twenty-four bits of address are sent (marked "3" in the figure) during the next six F_SCK cycles. The address phase ends (marked "4" in the figure) during eight dummy bit cycles that are sent over the C-SPI. The transaction is initiated such that four dummy bits on the M-SPI will also end during the eight dummy bits on the C-SPI. (The SPI bridge inserts dummy cycles on the M-SPI if dummy cycles are inserted on the C-SPI.) For Quad-I/O transactions, as well, the transaction on the C-SPI will typically end (marked "5" in the figure) later than the transaction over the M-SPI, unless the transaction on the C-SPI ends before sixty-four bytes are fetched by the SPI bridge. After the completion of a transaction on the M-SPI, the data on the C-SPI is loaded from the buffer 48.

The signal diagrams shown in FIGS. 3A-3C and 4-5 demonstrate example relaying schemes, which are chosen purely for the sake of conceptual clarity. In alternative embodiments, any other suitable relaying scheme can be used.

For some types of memory transactions, SPI bridge 40 identifies the transaction command-code, and in response sets the M-SPI clock rate to the same value as the C-SPI clock rate. Such transaction types comprise, for example, write enable (command-code 06h), write disable (04h), program (write) data (02h), write to status register (01h), enable write to status register (50h or 60h), erase, chip erase (c7h), or any other suitable transaction type. For these types of transactions that use the same clock rate on the C-SPI and M-SPI, internal buffering is typically minimized.

In some embodiments, SPI bridge 40 applies a different process to read status transactions. A read status transaction does not have an address field, and requires immediate response. Typically, the SPI bridge does not have sufficient time to fetch the status data from memory 32 and relay it to the chipset. Instead, in some embodiments the SPI bridge occasionally fetches the status data of memory 32 regardless of receiving read status transactions from the chipset. In one example embodiment, the SPI bridge may fetch status data every 2 mS when the M-SPI is free, every 500 μS following a write or erase transaction and after every write status transaction. Thus, the SPI bridge maintains an up-to-date copy of the status data. Upon detecting a read status transaction (05h or 35h) initiated by the chipset, the SPI bridge responds with the internally-stored status data.

Arbitration Between Chipset and EC Memory Transactions

Figure 6:
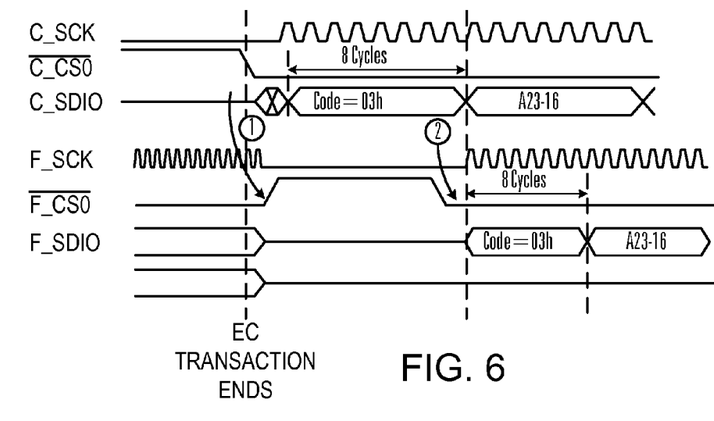

FIG. 6 is a signal diagram showing a scheme for relaying memory transactions by EC 28 between chipset 24 and memory 32, in accordance with another embodiment of the present invention. This signal diagram demonstrates how a memory transaction for the EC is aborted upon identifying a standard (normal) read memory transaction issued by the chipset. When SPI bridge 40 identifies a chipset memory transaction while an EC memory transaction is in progress, the SPI bridge immediately aborts the EC memory transaction by de-asserting the $\overline{F\_CS0}$ chip select signal (marked "1" in the figure).

Typically, the $\overline{F\_CS0}$ chip select signal is asserted (marked "2" in the figure) just before the end of the command-code phase of the chipset memory transaction. If the command-code of the chipset memory transaction is 03H (normal read transaction), then the M-SPI clock rate is 4/3 times faster than the C-SPI clock rate, and the EC memory transaction can be initiated on the M-SPI immediately after the last bit of the chipset command command-code.

Figure 7:
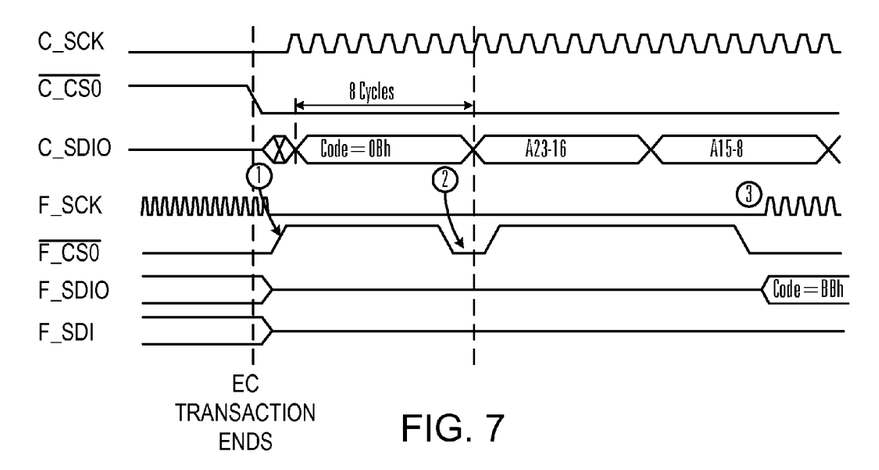

FIG. 7 is a signal diagram showing a scheme for relaying memory transactions by EC 28 between chipset 24 and memory 32, in accordance with an alternative embodiment of the present invention. This signal diagram demonstrates how a memory transaction for the EC is aborted upon identifying a fast-read memory transaction issued by the chipset. When SPI bridge 40 identifies the chipset memory transaction, the SPI bridge aborts the on-going EC memory transaction by de-asserting the $\overline{F\_CS0}$ chip select signal (marked "1" in the figure).

Typically, the $\overline{F\_CS0}$ chip select signal is asserted (marked "2" in the figure) just before the end of the command-code phase of the chipset memory transaction. If the command-code of the chipset memory transaction is 0Bh (fast read transaction) or 3Bh (fast read dual output transaction), the SPI bridge de-asserts the chip select signal again. The first F_SCK cycle is generated (marked "3" in the figure) $34t_{C-CSK}$–$20t_{F-CSK}$ cycles after the first C_CSK clock rising edge.

Figure 8:
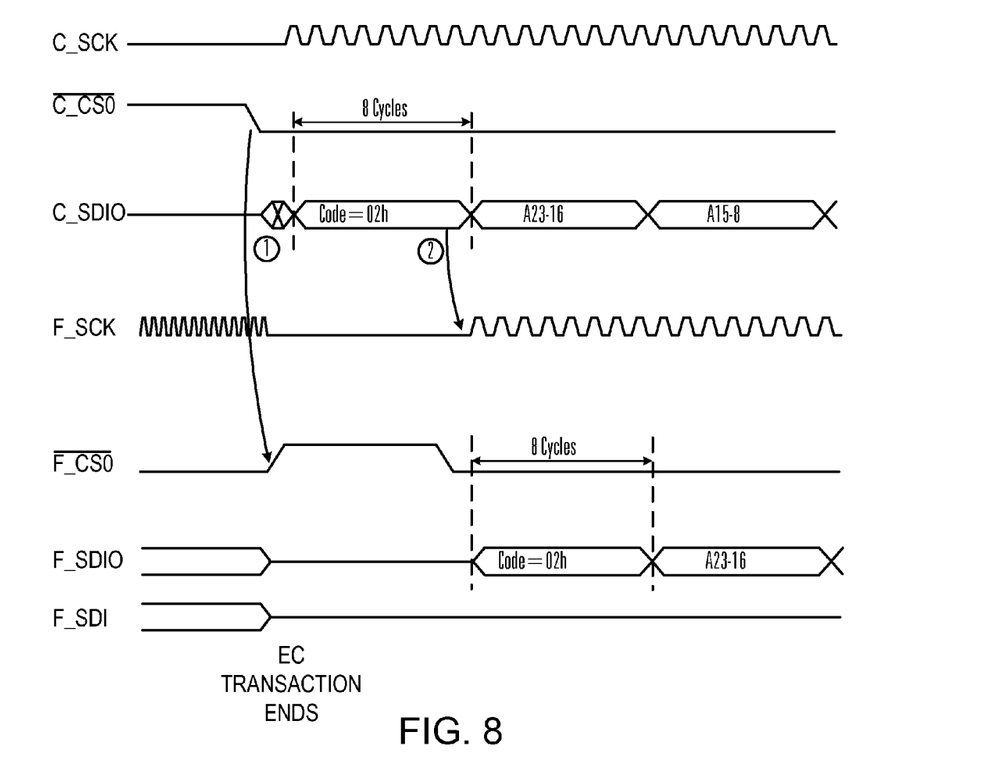

FIG. 8 is a signal diagram showing a scheme for relaying memory transactions by EC 28 between chipset 24 and memory 32, in accordance with another embodiment of the present invention. This example demonstrates how a memory transaction for the EC is aborted upon identifying a write or erase memory transaction issued by the chipset. When SPI bridge 40 identifies the chipset memory transaction, the SPI bridge aborts the EC memory transaction by de-asserting the $\overline{F\_CS0}$ chip select signal (marked "1" in the figure). As before, the $\overline{F\_CS0}$ chip select signal is typically asserted (marked "2" in the figure) just before the end of the command-code phase of the chipset memory transaction. If the command-code of the chipset memory transaction is 02h (simple write transaction) or other command-code with similar characteristics (e.g., erase transaction), the SPI bridge sets the M-SPI clock rate to be the same as the C-SPI clock rate. The transaction on the memory side is initiated immediately following the last bit of the chipset command-code.

The signal diagrams shown in FIGS. 6-8 demonstrate example arbitration schemes, which are chosen purely for the sake of conceptual clarity. In alternative embodiments, any other suitable arbitration scheme can be used.

In some embodiments, EC 28 carries out the disclosed techniques in different ways during initialization of chipset 24 and during normal operation after initialization. During chipset initialization, the chipset typically generates standard SPI read transactions (command-code 03h) at a clock rate of up to 20 MHz. This type of SPI transaction requires the first data bit of a transaction to be valid on the SPI on the next clock cycle after the last address bit. Since EC 28 is connected between memory 32 and chipset 24, the last address within a transaction should pass through the EC and arrive at the memory before the clock rising edge on the M-SPI. On the next M-SPI clock (F_SCK) falling edge, the first data is driven on the serial data out of memory 32, the data on the serial data of the C-SPI should be ready before the next rising edge of the C_SCK clock after passing through the EC.

EC 28 may meet these requirements in several ways. In some embodiments, as described above (e.g., in FIGS. 3A-3C) the EC uses a higher clock rate on the M-SPI in comparison with the C-SPI, such that the two clock signals are synchronized. Since both the chipset and the memory support frequencies higher than 20 MHz, EC 28 can use the redundant timing on the C-SPI and M-SPI in order to have the first data on time on the C-SPI. Note that since the M-SPI clock rate is higher than the C-SPI clock rate, pre-fetched data is typically used after the first or second data bit.

In various embodiments, SPI bridge 40 may generate the clock signal F_SCK for the M-SPI using any suitable technique. For example, bridge 40 may synchronize the C_SCK and the F_SCK signals using a Phase Locked Loop (PLL) mechanism or using any other clock phase synchronization mechanism known in the art. In an alternative embodiment, SPI bridge 40 generates the clock signal F_SCK for the M-SPI in accordance with the following procedure. In the following description, division by a power of two is implemented by shifting, such that only the integer part of the result is retained:

1. Generate the 150 MHz clock signal HFCK.
2. Count the edges of the HFCK cycles in a moving window of three C-SPI clock cycles. The count is denoted CNT3_150M.
3. Update the number of HFCK edges (denoted CNT1_150M) within each C-SPI clock cycle, on each C_SCK cycle.
4. Set the ratio between F_SCK and C_SCK to 4/3, such that four F_SCK clock cycles are generated for every three C_SCK clock cycles.
5. From the sixth positive edge of C_SCK and on every third edge (i.e., when starting counting from zero, on edges 6, 9, 12, 15, . . . ), generate a set of four F_SCK clock cycles. These points are referred to as the F_SCK initiation points.
6. Following a F_SCK initiation point, wait for (CNT1_150M±Const) half HFCK clock cycles, and then trigger a positive edge of F_SCK (may be at any edge of HFCK). The parameter Const is used to tune the exact location of the F_SCK rising edge relative to the C_SCK rising clock edge during the cycle that follows the F_SCK insertion point.
7. The high period (H PER) of the F_SCK signal is two HFCK periods.
8. The clock duration of the first clock is CNT3_150M/4 half HFCK cycles. For example, if CNT3_150M=59, then 59/4=14 half HFCK cycles. Thus, the length of the first low period is 14−4=10 half HFCK periods.
9. The high period of the second F_SCK signal is two HFCK periods.
10. The second clock ends at the positive edge of the third F_SCK cycle, which is generated CNT3_150M/2 half HFCK periods after the F_SCK initiation point. In the present example, the second clock ends after 29 half HFCK periods.
11. The high period of the third F_SCK signal is two HFCK periods.
12. The positive edge of the fourth F_SCK cycle is generated after (CNT3_150M−(CNT3_150M/2))/2+ CNT3_150M/2 half HFCK periods. In the present example, the positive edge of the fourth F_SCK cycle is generated after (59−29)/2+29=44.
13. The high period of the fourth F_SCK signal is two HFCK periods.
14. The next F_SCK positive edge will be on the first edge of the next set of F_SCK clock cycles.

In some embodiments, EC 28 generates the system reset for computer 20 and in particular for chipset 24. During system reset, the EC loads a descriptors section (whose size is typically 4 KB) from memory 32 and stores it in an on-chip Random Access Memory (RAM—not shown in the figure). After system reset, during the system initiation period, the EC uses the pre-loaded descriptors section instead of the descriptors data stored in memory 32. After the initiation period, fast read or fast read dual output transactions can be used on the SPI interface (the EC can overrun the relevant descriptor if this is not the original descriptors setting). The protocol of these transactions has 8 clock dummy cycles after the last address bit within a transaction. Therefore, this technique is considerably more timing-tolerant in comparison with standard read transactions.

After the initiation phase, the chipset typically reads the descriptors section and is instructed to use fast-read or fast-read dual-output transactions (e.g., FIG. 4) having eight dummy clock cycles after the last address bit in a transaction. In both cases, the M-SPI clock rate is set to be higher than or equal to the C-SPI clock rate. As a result, since the maximal length of a chipset memory transaction is sixty-four bytes, the maximum length of a pre-fetched transaction is also sixty-four bytes. In order to ease the timing constraints of the interface, fast-read Dual-I/O or Quad-I/O transactions can be used on the M-SPI. The Dual-I/O or Quad-I/O transactions use only four dummy clock cycles after the last address bit. In case of long memory transactions over the C-SPI, this configuration typically allows sufficient code fetch bandwidth for the EC microcontroller.

Although the embodiments described herein mainly address sharing of an SPI bus between a CPU chipset and an EC microcontroller, the methods and systems described herein can also be used in other applications that require serial bus sharing but in which no arbitration between bus masters is defined for the bus.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An embedded controller, comprising:
a microcontroller core; and
memory control circuitry, which is configured to communicate with a Central Processing Unit (CPU) chipset over a first Serial Peripheral Interface (SPI), for which bus arbitration is not supported, at a first clock rate, to communicate with a memory over a second SPI at a second clock rate that is fixed during any given memory transaction, to relay memory transactions between the CPU chipset and the memory over the first and second SPIs, to identify time intervals in which no memory transactions are relayed on the second SPI and to retrieve from the memory information for operating the microcontroller core during the identified time intervals.

2. The embedded controller according to claim 1, wherein the information comprises software code for running the microcontroller core, and wherein the memory control circuitry is configured to retrieve the software code from the memory during the identified time intervals and to cause the microcontroller core to execute the retrieved software code.

3. The embedded controller according to claim 1, wherein the second clock rate is greater than or equal to the first clock rate.

4. The embedded controller according to claim 1, wherein the memory control circuitry is configured to generate a second clock signal for use in the second SPI based on a first clock signal used in the first SPI.

5. The embedded controller according to claim 1, wherein the microcontroller core is configured to continue operating while the second SPI is occupied by the memory transactions and the memory control circuitry is unable to retrieve the information from the memory.

6. The embedded controller according to claim 5, wherein the microcontroller core is configured to continue operating using alternative information stored in alternative memory when the memory control circuitry is unable to retrieve the information from the memory.

7. The embedded controller according to claim 1, wherein the memory control circuitry is configured to produce a validity signal indicating whether it is able to retrieve the information from the memory.

8. The embedded controller according to claim 1, wherein, for relaying a memory transaction, the memory control circuitry is configured to communicate with the CPU chipset in accordance with a first transaction type and with the memory in accordance with a second transaction type, different from the first transaction type.

9. The embedded controller according to claim 8, wherein the first transaction type provides address information on a first number of interface lines, and wherein the second transaction type provides the address information on a second number of interface lines, different from the first number.

10. The embedded controller according to claim 8, wherein the first transaction type provides data information on a first number of interface lines, and wherein the second transaction type provides the data information on a second number of interface lines, different from the first number.

11. The embedded controller according to claim 8, wherein each of the first and second transaction types comprises at least one transaction type selected from a group of types consisting of a normal transaction, a fast-read transaction, a fast-read dual-Output transaction, a fast-read dual-I/O transaction and a fast-read Quad-I/O transaction.

12. The embedded controller according to claim 8, wherein the first transaction type is set by the CPU chipset, and wherein the memory control circuitry is configured to identify the first transaction type and to select the second transaction type based on the identified first transaction type.

13. The embedded controller according to claim 1, wherein the memory control circuitry is configured to identify a type of a memory transaction and to select the second clock rate based on the identified type.

14. The embedded controller according to claim 1, wherein the memory control circuitry is configured to convert a memory transaction over the first SPI into multiple memory transactions over the second SPI.

15. The embedded controller according to claim 1, wherein, in a memory transaction, the memory control circuitry is configured to transfer from the CPU chipset to the memory an address to be read, and to transfer from the memory to the CPU chipset data that is read from the address, such that the data is transferred over the first SPI starting on a clock cycle that immediately follows a last bit of the address.

16. The embedded controller according to claim 15, wherein first and second clock signals used respectively on the first and second SPIs are synchronous with one another and have defined timing during one or more cycles of the memory transaction.

17. The embedded controller according to claim 1, wherein the memory control circuitry is configured to insert one or more dummy cycles between address and data information transferred over the second SPI if dummy cycles are inserted by the CPU chipset on the first SPI.

18. The embedded controller according to claim 1, wherein the memory control circuitry is configured to pre-fetch data from the memory before the data is requested by the CPU chipset, to cache the pre-fetched data and to subsequently provide the cached data to the CPU chipset.

19. The embedded controller according to claim 1, wherein the memory control circuitry is configured to pre-fetch status information from the memory irrespective of receiving read status transactions from the CPU chipset, and to provide the pre-fetched status information to the CPU chipset upon receiving the read status transactions.

20. The embedded controller according to claim 1, wherein the memory control circuitry is configured to pre-fetch a descriptors section from the memory during an initiation phase of the CPU chipset, to store the descriptors section in an internal memory of the embedded controller, and, after the initiation phase, to provide the stored descriptors section to the CPU chipset.

21. A method, comprising:
using an embedded controller, communicating with a Central Processing Unit (CPU) chipset over a first Serial Peripheral Interface (SPI), for which bus arbitration is not supported, at a first clock rate, and with a memory over a second SPI at a second clock rate that is fixed during any given memory transaction;
relaying memory transactions between the CPU chipset and the memory over the first and second SPIs;
identifying time intervals in which no memory transactions are relayed on the second SPI; and
retrieving from the memory information for operating the embedded controller during the identified time intervals.

22. The method according to claim 21, wherein retrieving the information comprises fetching software code from the memory during the identified time intervals, and causing the microcontroller core to execute the fetched software code.

23. The method according to claim 21, wherein the second clock rate is greater than or equal to the first clock rate.

24. The method according to claim 21, wherein communicating with the CPU chipset and the memory comprises generating a second clock signal for use in the second SPI based on a first clock signal used in the first SPI.

25. The method according to claim 21, wherein retrieving the information comprises continuing to operate the microcontroller core while the second SPI is occupied by the memory transactions and retrieval of the information from the memory is blocked.

26. The method according to claim 25, wherein continuing to operate the microcontroller core comprises operating the microcontroller core using alternative information stored in alternative memory when retrieval of the information from the memory is blocked.

27. The method according to claim 21, wherein continuing to operate the microcontroller core comprises producing a validity signal indicating whether the retrieval of the information from the memory is blocked.

28. The method according to claim 21, wherein relaying the memory transactions comprises, for a memory transaction, communicating with the CPU chipset in accordance with a first transaction type and with the memory in accordance with a second transaction type, different from the first transaction type.

29. The method according to claim 28, wherein the first transaction type provides address information on a first number of interface lines, and wherein the second transaction type provides the address information on a second number of interface lines, different from the first number.

30. The method according to claim 28, wherein the first transaction type provides data information on a first number of interface lines, and wherein the second transaction type provides the data information on a second number of interface lines, different from the first number.

31. The method according to claim 28, wherein each of the first and second transaction types comprises at least one transaction type selected from a group of types consisting of a normal transaction, a fast-read transaction, a fast-read dual-Output transaction, a fast-read dual-I/O transaction and a fast-read Quad-I/O transaction.

32. The method according to claim 28, wherein the first transaction type is set by the CPU chipset, and wherein relaying the memory transactions comprises identifying the first transaction type and selecting the second transaction type based on the identified first transaction type.

33. The method according to claim 21, wherein communicating with the CPU chipset and the memory comprises, identifying a type of a memory transaction and selecting the second clock rate based on the identified type.

34. The method according to claim 21, wherein relaying the memory transactions comprises converting a memory transaction over the first SPI into multiple memory transactions over the second SPI.

35. The method according to claim 21, wherein, in a memory transaction, relaying the memory transactions comprises transferring from the CPU chipset to the memory an address to be read, and transferring from the memory to the CPU chipset data that is read from the address, such that the data is transferred over the first SPI starting on a clock cycle that immediately follows a last bit of the address.

36. The method according to claim 35, wherein first and second clock signals used respectively on the first and second SPIs are synchronous with one another and have defined timing during one or more cycles of the memory transaction.

37. The method according to claim 21, wherein relaying the memory transactions comprises inserting one or more dummy cycles between address and data information transferred over the second SPI if dummy cycles are inserted by the CPU chipset on the first SPI.

38. The method according to claim 21, wherein relaying the memory transactions comprises pre-fetching data from the memory before the data is requested by the CPU chipset, caching the pre-fetched data and subsequently providing the cached data to the CPU chipset.

39. The method according to claim 21, wherein relaying the memory transactions comprises pre-fetching status information from the memory irrespective of receiving read status transactions from the CPU chipset, and providing the pre-fetched status information to the CPU chipset upon receiving the read status transactions.

40. The method according to claim 21, wherein relaying the memory transactions comprises pre-fetching a descriptors section from the memory during an initiation phase of the CPU chipset, storing the descriptors section in an internal memory of the embedded controller, and, after the initiation phase, providing the stored descriptors section to the CPU chipset.

41. A computer, comprising:
a Central Processing Unit (CPU) chipset;
a memory; and
an embedded controller, which is configured to communicate with the CPU chipset over a first Serial Peripheral Interface (SPI), for which bus arbitration is not supported, at a first clock rate, to communicate with the memory over a second SPI at a second clock rate that is fixed during any given memory transaction, to relay memory transactions between the CPU chipset and the memory over the first and second SPIs, to identify time intervals in which no memory transactions are relayed on the second SPI bus, and to retrieve from the memory information for operating the embedded controller during the identified time intervals.

\* \* \* \* \*